Figure 1:
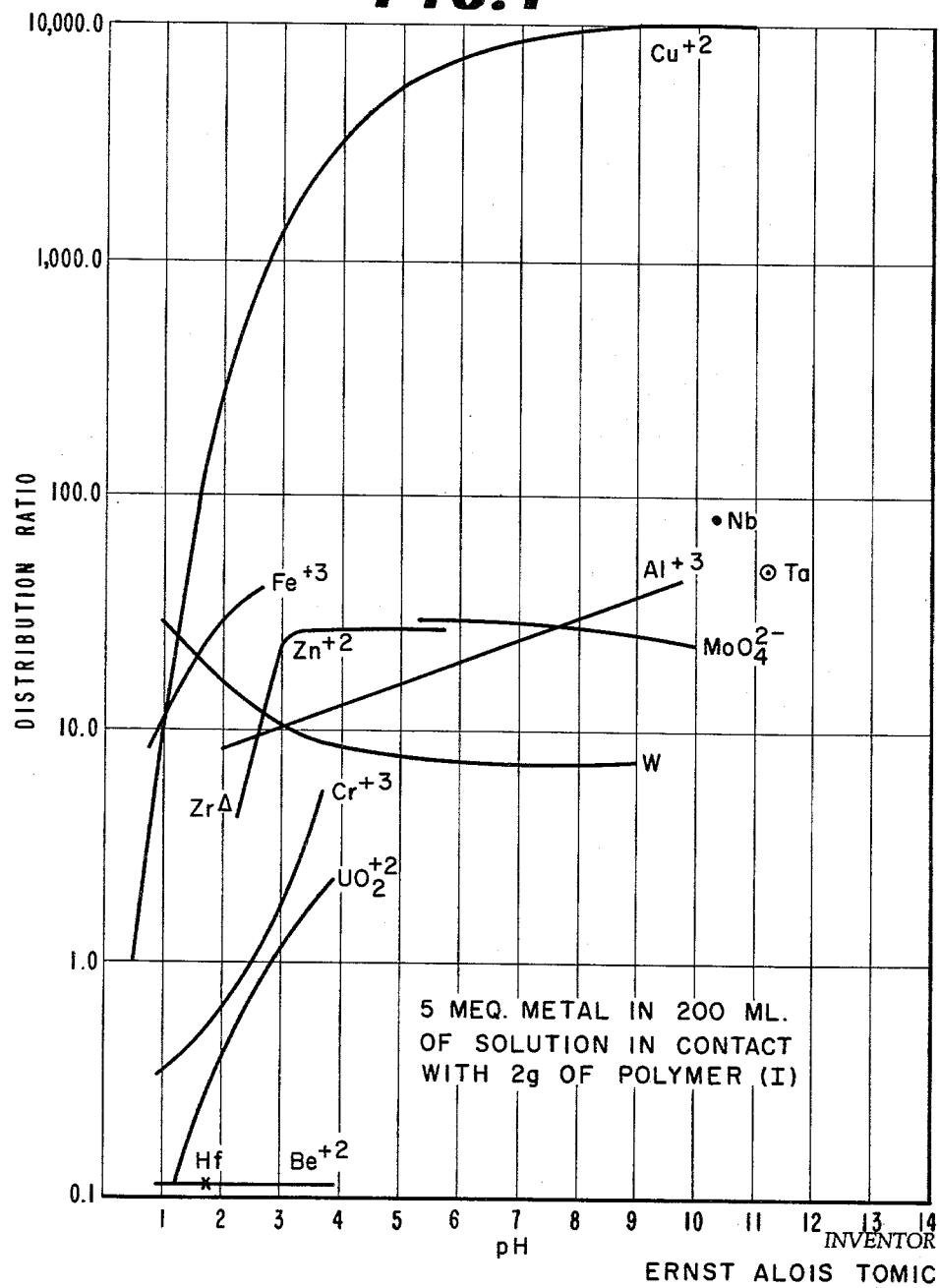

July 20, 1965 E. A. TOMIC 3,196,107
PROCESS FOR REMOVING COPPER IONS FROM SOLUTION
Filed March 13, 1961

INVENTOR
ERNST ALOIS TOMIC
BY John H. Tregoning
ATTORNEY 3,196,107
PROCESS FOR REMOVING COPPER
IONS FROM SOLUTION
Ernst Alois Tomic, Wilmington, Del., assignor to E. I.
du Pont de Nemours and Company, Wilmington, Del.
Filed Mar. 13, 1961, Ser. No. 95,305
20 Claims. (Cl. 210—38)

This invention relates to a process for the removal of copper from non-aqueous and aqueous solutions employing a polymeric agent especially selective for copper. More particularly, this invention relates to such a process involving the formation of copper chelates by the interaction of certain organic polymers with copper-containing solutions.

Problems arising from the presence of small amounts of certain metal contaminants in various processes are well known in the art. For instance, as little as two-to-four micrograms of copper per liter of aqueous solution in streams flowing through aluminum processing equipment causes extensive corrosion damage. Furthermore, trace amounts of copper in gasoline initiates the formation of gummy deposits during gasoline storage; and undesirable engine deposits in internal combustion engines are directly associated with the presence of small amounts of copper in the fuels.

It is an object of this invention, therefore, to provide a process for the removal of copper even in trace amounts, from aqueous or non-aqueous solutions. It is a further object of the invention to provide a process for the quantitative recovery of copper from copper-containing solutions. It is a still further object to employ a chelating polymer selective for copper for the substantially complete removal of copper from solution. It is another object of the invention to provide a process for the separation of copper from solution, notwithstanding the presence of many other metallic ions in the solution. Other and additional objects will become apparent from the following description.

These objects are accomplished in accordance with this invention which provides a process comprising contacting copper-containing solutions with insoluble, polymeric materials having a repeating thiosemicarbazide unit of the structural formula

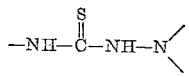

said unit forming a five-membered heterocyclic ring with copper through chelation.

The thiosemicarbazide repeating unit may occur at regular or irregular intervals, or both, within the polymer chain; however, the affinity of this atomic grouping for copper ions is so great that the remaining portion of the polymer is usually of no importance. Even the presence of other non-specific cation active groups such as other chelating groups or ion exchange groups has little influence upon the formation of the copper-thiosemicarbazide chelate. Of course, the introduction of such groups has the overall affect of reducing the polymer selectivity, and those skilled in the art will be aware of the undesirability of the presence of such groups when selective removal and/or recovery of copper is to be practiced.

Especially suitable polymers for the practice of this invention are the condensation products of 1,4-diaminopiperazines and diisothiocyanates such as methylene bis (4-phenylisothiocyanate), toluene diisothiocyanate, hexamethylene diisothiocyanate and the like. The method of preparation of these and other suitable polymers is described in copending application, Serial No. 747,592, filed in the name of Ralph G. Beaman on July 10, 1958, now Patent No. 3,040,003. These polymers termed polythiosemicarbazides contain the linkage

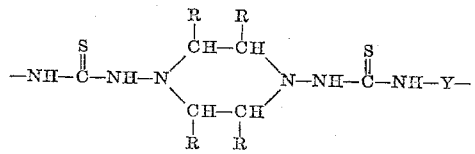

wherein R is hydrogen or a lower alkyl radical containing up to four carbon atoms and Y is a divalent organic radical derived from the diisothiocyanate organic coreactant. The portion of the polymer designated —Y— is widely variable, and representative are the alkylene radicals such as hexamethylene; radicals such as phenylene; biphenylene; naphthylene; tolylene and the like.

The polythiosemicarbazide polymers which are most useful in the process of this invention have inherent viscosities in the range from about 0.1 to 4.0, in dimethyl sulfoxide indicating molecular weights in the range from about one thousand to about one million, those having inherent viscosities within the range from about 0.2 to 2.5 being preferred.

The process for removing copper from its solutions is extremely simple and convenient. It is required only that the copper-containing solution be contacted with one of the above-described polymeric compositions. For example, if the polymeric materials are added to a batch of the solution to be treated, the mixture is stirred and allowed to settle. Alternatively, if column operations are employed, the copper-containing solution is passed over a bed or column of the polymeric composition. The rate of flow of the solution may be adjusted to affect complete removal of the copper in one pass, or the solution may be passed over the column at a more rapid rate and recycled until copper removal is complete.

As in ordinary ion exchange processes, the rate of metal uptake by the polymers is controlled chiefly by gel diffusion and hence equilibrations are most rapid with those polymers which have been swollen in an appropriate solvent prior to rise. However, preswelling is not critical to the process since the same end result is achieved in use, after the polymer has been in contact with the system for a sufficient period of time. Of course, the polymer is fully effective only after swelling, i.e., after the pores of the polymer have become filled with the liquid from which copper is to be sorbed.

The effective absorption of copper from aqueous solution takes place over a wide pH range. This range is limited in a practical sense, either by the hydrolysis of the metal ion or by the rapid deterioration of the polymer, especially under strongly acidic conditions. Optimum conditions of pH are within the range 1–12. The higher pH values, i.e., pH 5 and higher, are those achieved with bases such as ammonia and ammonia derivatives such as amines in which copper is stabilized in solution in the form of a complex ion. Preferred operating conditions are within the pH range 2.0 to 11.

When the resin has become saturated with copper or if the resin becomes relatively inefficient as an absorbent for copper, the resin may be regenerated. Regeneration involves elution of the copper by a solution of a strong complexing agent or a strong acid. To be most effective, it appears that the elutrient must form a more stable complex with the copper than that formed between copper and the thiosemicarbazide linkage of the resin. Partial regeneration is achieved with an acid solution, such as one molar sulfuric acid. Especially suitable is a solution of cyanide ion, such as sodium or potassium cyanide solutions, which affords essentially quantitative recovery of the copper. Also useful, although somewhat less effective, are elutrients such as ethylenediaminetetracetic acid, glycine, citric acid, etc. The polymer is reusable after regeneration, showing no change in sorption characteristics and efficiency.

The separation of copper from aqueous solutions containing other metal ions is also achieved in a straightforward manner. Separation processes are usually pH dependent. Aqueous solutions are adjusted to an appropriate pH and contacted with the resin. The high selectivity of the polymer for copper permits its preferential sorption on the resin, and the other metal ions tend to remain in solution. Copper is readily separated from metals such as beryllium, thorium, uranium, cerium, molybdenum, tungsten, niobium, tantalum, hafnium, zirconium, iron, nickel, aluminum, zinc, calcium, magnesium and the like by control of pH. The optimum experimental conditions for sorption and separation of metal ions on these particular polymers are determined by examining the selectivity and capacity of the polymer for the metal ions as a function of pH. A typical procedure providing such data is as follows: Weighed polymer samples (2 g.) are preswollen by shaking for 24 hours with 1 M sodium nitrate adjusted to the desired pH. The solution is removed and the polymer is equilibrated with five milliequivalents of each of a variety of metal ions at 25° C., employing 1 M sodium nitrate as basic electrolyte, at the same pH. The metal solutions may contain a radioactive isotope of the metal whenever suitable isotopes are available to permit radiochemical detection. Equilibrations are made at various pH values. pH adjustment is made and maintained with sodium hydroxide or nitric acid. Each solution remains in contact with the polymer until the pH varies no more than ±0.1 pH unit. An aliquot of the solution is then removed and its metal content is determined by scintillation counting using a gamma spectrometer, by photometric techniques for metals for which there is no suitable tracer, or other methods when required. From these data, a distribution ratio is computed, employing the expression $$D = \frac{\text{meq. of metal or polymer}}{\text{meq. of metal in solution}} \times \frac{\text{volume of solution}}{\text{weight of dry polymer}}$$

Distribution ratios are computed over a range of pH values for each metal ion. Plots of the logarithm of the distribution ratio against pH for each of the metal ions provide a graphical means of determining optimum pH of operation for a particular separation. The curves found in FIGURE 1 represent typical results of this procedure. It is shown, for instance, that by employing a pH of about 3, copper can be separated from chromium, the distribution ratios being about 1000 to 1, respectively.

The following examples are provided to illustrate the versatility of the process as applied to aqueous solutions and are not to be construed as limiting in any way.

EXAMPLE I

A sample of polythiosemicarbazide polymer weighing 0.25 g. is slurried in 25 ml. of 1.5 M ammonium hydroxide. After 24 hours, the ammonia solution is removed by filtration through a filter stick. To the wet polymer is added 50 ml. of a copper solution labeled with Cu-64, containing 30.85 mg. of $Cu^{++}$ in 50 ml. of 1.5 M ammonium hydroxide. The slurry is shaken for 24 hours. Aliquots are withdrawn after this time and the copper content is determined by scintillation counting. Copper standards are counted before and after each of the equilibration samples to correct for the decay of the short-lived Cu-64 isotope ($t_1/_2$=12.8 hours). The amount of copper sorbed on the polymer is 0.92 meq. per 0.25 g. of polymer.

The polymer contains as the repeating unit:

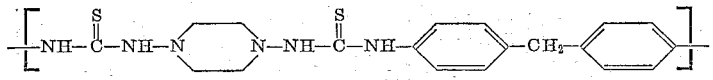

and is prepared from N,N'-diaminopiperazine and methylene bis(4-phenylisothiocyanate). This polymer is designated throughout as polymer (I), and it has an inherent viscosity of 1.07 in dimethyl sulfoxide.

EXAMPLE II

The procedure of Example I is followed except that polymer (I) is replaced by its dimethyl derivative which has as the repeat unit:

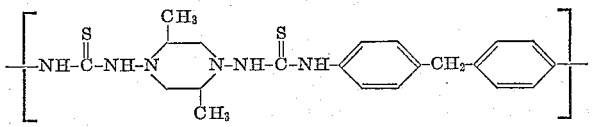

This polymer is designated polymer (II), and it has an inherent viscosity of 0.84 in dimethyl sulfoxide. The polymer capacity is 0.73 meq. $Cu^{++}$ per 0.25 g. of polymer.

The polymer is prepared from methylene bis(4-phenylisothiocyanate) and N,N' - diamino - 2,6-dimethylpiperazine.

EXAMPLE III

The procedure of Example I is followed except that polymer (I) is replaced by polymer (III) having the repeat unit:

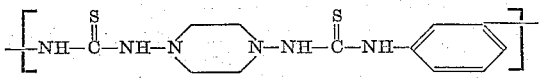

The polymer capacity is 0.96 meq. of $Cu^{++}$ per 0.25 g. of resin.

The polymer is prepared from N,N'-diaminopiperazine and phenylenediisothiocyanate. The polymer is insoluble in common organic solvents.

EXAMPLE IV

The procedure of Example I is followed except that a polymer having the following repeat unit is substituted:

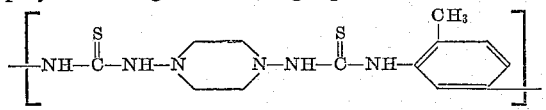

This polymer is herein designated polymer (IV). The polymer capacity is 6.3 meq. $Cu^{++}$ per gram of polymer.

The polymer is prepared from N,N'-diaminopiperazine and toluene diisothiocyanate, and it has an inherent viscosity of 0.85 in dimethyl sulfoxide.

EXAMPLE V

A 1 g. sample of polymer (I) is slurried in 100 ml. of 1 M sodium nitrate, adjusted to pH 3.6 with nitric acid, for 24 hours. The sodium nitrate solution is removed, and 100 ml. of a copper solution containing 2 meq. of copper, tagged with Cu-64 in 1 M sodium nitrate at pH 3.6 is added. The slurry is agitated for 24 hours, after which an aliquot of solution is removed and its copper content is determined radiochemically. The polymer has a capacity of 0.87 meq. of $Cu^{++}$ per gram of resin at this pH.

EXAMPLE VI

The procedure of Example V is followed except that the polymer (I) is replaced by polymer (IV). This polymer has a capacity of 0.8 meq. of $Cu^{++}$ per gram of resin at pH 3.6.

EXAMPLE VII

Two liters of tap water are poured through a 20 x 1 cm. column containing 5 g. of polymer (I) at a rate of one milliliter per minute. The effluent is evaporated to dryness and its copper content is determined photometrically. Two liters of untreated tap water are also evaporated for comparison. The untreated tap water contains 0.183 mg. of copper per milliliter, whereas the treated water contains only 0.063 mg. of copper per milliliter. The copper content is reduced about 66 percent in one pass.

By varying the column dimensions and/or rate of flow, or recycling the effluent, the copper content of tap water is reduced to essentially zero, as determined by radiochemical techniques.

EXAMPLE VIII

A column, 20 × 1 cm., contains 1.5 g. of polymer (I) which has been slurried in water overnight. The column is treated as follows: 100 ml. of a 1.5 M ammonium hydroxide solution is passed over the polymer at a rate of approximately 2ml./min.; solution of 3 ml. of a 1 M cupric nitrate solution, diluted to 275 ml. with 1.5 M ammonium hydroxide, is passed over the polymer at a rate of 2 ml./min.; the adsorbate is rinsed with 100 ml. of 1.5 M ammonium hydroxide and then with 100 ml. of water.

Two hundred milliliters of 1 M potassium cyanide is then passed over the adsorbate at a rate of 0.3 to 0.5 ml./min. The column is rinsed with 50 ml. of $H_2O$. The polymer is removed from the column, is dried and is weighed. One gram is ashed and the residue is dissolved in nitric acid. Copper, as determined photometrically in the ash, is eluted to the extent of 99.8%. The infrared spectrum of the eluted polymer is identical with that of the starting material.

EXAMPLE IX

A 1 g. sample of polymer (I), preswollen by slurrying in 1 M sodium nitrate at pH 2.5 for 24 hours, is agitataed with 50 ml. of a solution containing 1 meq. of $Fe^{++}$ and 1 meq. of $Cu^{++}$, tagged with Fe-59 and Cu-64 isotopes, prepared in 1 M sodium nitrate and adjusted to pH 2.5 with nitric acid. The slurries are agitated at 25° C., and after 24 hours, aliquots are removed. The copper content and the iron content are determined by scintillation counting in a gamma-spectrometer. Sixty-five and three tenths percent of the copper and only 7.05 percent of the iron are sorbed on the polymer.

EXAMPLE X

The procedure of Example IX is followed except that the polymer is contacted with 50 ml. of a solution containing 1 meq. of $Ni^{+2}$ and 1 meq. of $Cu^{++}$. Copper is determined by scintillation counting and nickel is determined photometrically. The polymer sorbs 62.5 percent of the copper and only 16.7 percent of the nickel.

EXAMPLE XI

At a rate of 20–30 gallons per square foot per minute, 25,000 gallons of water with copper content varying from 5–25 parts per billion is passed through a cylinder approximately 2 ft. × 2 in. The cylinder contains approximately 0.22 pound of of polymer (I). The water temperature varies between 70 and 100° F.. The copper content of the water is reduced to 0–1 part per billion.

The high selectivity of the thiosemicarbazide polymers for copper extends even to non-aqueuos systems. The procedure is essentially the same as that applied to aqueous solutions. The polymer is contacted with the copper-containing organic solution, employing either batch or column techniques, and copper removal is substantially complete. The spent polymer is regenerated by washing with an organic solvent such as acetone followed by aqueous potassium cyanide. The polymer may be dried and used again.

Copper can be removed from a wide variety of organic solutions, for instance from ketones, ethers, alcohols, hydrocarbons, halocarbons, amides and miscellaneous solutions such as petroleum ether, gasoline, tetrahydrofuran, and the like.

The applicability of the process to non-aqueous systems is shown in the following examples.

EXAMPLE XII

Stock solutions of copper oleate containing 1 mg. of cupric ion per milliliter of petroleum ether, or when solubility allows, direct solutions containing equivalent concentrations of copper nitrate, tagged with the Cu-64 isotope, are prepared and 1 ml. portions are added to 49 ml. of each of the following organic liquids: acetone, methylisobutyl ketone, diethyl ether, butyl cellosolve, ethyl alcohol, propyl alcohol, heptyl alcohol, benzene, toluene, n-decant, cyclohexane, cyclohexene, trichloroethylene, tetrahydrofuran and dimethyl formamide. To each of these solutions is added 0.1 g. of polymer (I) in dry form, and each mixture is stirred for 24 hours at room temperature. Each solution is removed from the polymer by filtration, and the copper content of each of the filtrates is determined by scintillation counting. Copper is removed completely in all cases.

EXAMPLE XIII

To 250 ml. of a "regular" grade of gasoline, copper oleate tagged with Cu-64 is added to give a copper content of 100 mg./ml. This solution is passed at a rate of 0.3 ml./min. over a 20 × 1 cm. column containing 1.5 g. of polymer (I) which is presoaked in petroleum ether. The effluent contains no copper detachable by scintillation counting. The tetraethyl lead content of the gasoline is measured before and after the treatment by ASTM method D–526–48T. The tetraethyl lead content does not change.

ASTM method D–526–48T, briefly described, is as follows:

To 50 ml. of gasoline is added about 50 ml. of "heavy distillate" and 50 ml. of concentrated hydrochloric acid, and the mixture is refluxed for 30 minutes. After cooling, the acid layer is removed; 50 ml. of water is added to the gasoline fraction and the mixture is refluxed for 5 minutes. The water layer is removed and combined with the acid extract and the liquid is evaporated to dryness. The organic matter in the residue is destroyed by heating with concentrated nitric acid. Dilute nitric acid is added and the mixture is heated until the lead dissolves as lead nitrate. After cooling, the solution is treated with nitrophenol indicator and ammonia is added until a color change is noted, and 4–5 ml. of ammonia is added in excess. The solution is neutralized with acetic acid, and 1–2 ml. of acetic acid is added in excess. The mixture is filtered and washed with hot water and the solution and washings are diluted to 350 ml. The solution is heated to boiling, 25 ml. of potassium dichromate is added dropwise, and the solution is boiled until an orange precipitate forms. The precipitate is allowed to settle, is filtered and is dried at 110–120° C. The tetraethyl lead content is computed from the expression $$\frac{604.9}{V_{gasoline}} \times g_{PbCrO_4} = \frac{ml.\ TEL}{l.\ gasoline}$$

EXAMPLE XIV

Samples of polymer (I) are saturated with copper ion by batch equilibration wtih an ammoniacal solution containing copper ion tagged with Cu-64. The polymer is filtered and washed free of adhering copper with a 2.5 M ammonia solution. There are adsorbed 127 mg. of copper ion per gram of polymer.

The copper is then eluted from the copper-saturated polymer by employing the following technique:

(A) The polymer is contacted with 50 ml. of eluting agent for 1 hour and then is separated from the eluate;

(B) The polymer from A is contacted with 25 ml. of eluting agent for 30 minutes and then is separated from the eluate.

(C) The polymer from B is contacted with 25 ml. of eluting agent for 20 minutes and then is separated from the eluate.

The percentage of copper eluted in each step is determined by scintillation counting.

The following eluting agents are employed:

I—1 M aqueous sodium cyanide.
II—1 M aqueous sulfuric acid.
III—1 M aqueous glycine.
IV—1 M aqueous citric acid.
V—0.1 M aqueous disodium ethylenediaminetetraacetate.

The results are tabulated below:

| Eluting Agent | Percent of Total Copper Eluted | | |
|---|---|---|---|
| | A | B | C |
| I | 81.4 | 5.9 | 1.7 |
| II | 32.6 | 5.9 | 2.9 |
| III | 13.7 | 4.4 | 2.3 |
| IV | 9.2 | 3.2 | 1.8 |
| V | 9.8 | 2.7 | 1.8 |

It has been shown that by contacting solutions containing copper with a polymer containing thiosemicarbazide groups as repeating units, copper is effectively removed from solutions under a wide variety of conditions. The success of the process of this invention is attributed to the ability of the thiosemicarbazide unit to form a very stable chelate with copper ion. The copper is bound in a five-membered chelate ring which is assigned the structure:

$$-NH-C=N \diagdown \atop S \diagdown \atop Cu \diagup N \diagup$$

The outstanding performance in this process of the diaminopiperazine-diisothiocyanate condensation polymers hereinbefore described is associated with a reinforcing of the chelate effect—the copper being intramolecularly bound in more than one chelate ring. These polymeric chelates are assigned the structure:

$$\left[ -NH-\overset{N\diagup\diagdown N}{\underset{S}{C}}-\overset{}{\underset{Cu}{\cdots}}-\overset{N\diagup\diagdown N}{\underset{S}{C}}-NH-Y- \right]_n$$

wherein the definition of Y is consistent with that given previously.

In carrying out the present invention, a great number of compounds, in addition to those illustrated in the examples, may be utilized in preparing the polythiosemicarbazides. Any of the known alkyl-substituted N,N'-diaminopiperazines in which the alkyl groups contain from one to four carbon atoms may be utilized, e.g., N,N'-diaminopiperazine, N,N'-diamino-2,6-dimethylpiperazine, N,N'-diamino-2,5-dimethylpiperazine, N,N'-diamino-2-methylpiperazine, etc. The N,N'-diaminopiperazines may be prepared by (1) nitrosation of a piperazine, (2) zinc-acetic acid reduction of the dinitrosopiperazine, (3) isolation of the bis-hydrazine by precipitation in the form of its dihydrochloride, and (4) regeneration of the free base by treatment of the salt with alcoholic potassium hydroxide.

In addition to the diisothiocyanates disclosed, other useful diisothiocyanates include 4-methyl-m-phenylene diisothiocyanate, m-phenylene diisothiocyanate, 4,4'-bisphenylene diisothiocyanate, 4-chloro-1,3-phenylene diisothiocyanate, 1,5-naphthylene diisothiocyanate, 1,4-tetramethylene diisothiocyanate, 1,6-hexamethylene diisothiocyanate, 1,10-decamethylene diisothiocyanate, 1,4-cyclohexylene diisothiocyanate, 4,4'-methylene-bis-(cyclohexylisothiocyanate), and 1,5-tetrahydronaphthalene diisothiocyanate. Arylene diisothiocyanates, i.e., those in which each of the isothiocyanate groups is attached directly to an aromatic ring are preferred. The diisothiocyanates may contain other substituents such as methoxy groups and bromo groups.

As used herein, inherent viscosity is calculated as $$\eta \text{ inh.} = \frac{\ln \eta \text{ rel.}}{C}$$

where $\eta$ rel. is the flow time for a dilute solution of the polymer in a capillary viscometer divided by the flow time for the pure solvent, both being measured at 30° C., ln is the natural logarithm, and C is equal to 0.5.

This invention has been described in detail with particular reference to preferred embodiments thereof, but it will be understood that variations and modifications can be effected within the spirit and scope of the invention as described hereinbefore and as defined in the appended claims.

I claim:

1. A process for removing copper ions from solution which comprises contacting said solution with a polymeric material having a repeating thiosemicarbazide unit of the structural formula:

$$-NH-\overset{S}{\overset{\|}{C}}-NH-N\diagdown\diagup$$

2. A process for the removal of copper from an aqueous solution containing dissolved copper salts comprising contacting said solution at a pH between about 1.5 and 11 with a polymer having as repeating units, thiosemicarbazide linkages structurally represented by the formula:

$$-NH-\overset{S}{\overset{\|}{C}}-NH-N\diagdown\diagup$$

3. The process of claim 1 wherein the resin is a polythiosemicarbazide resin having the repeating unit $$-NH-\overset{S}{\overset{\|}{C}}-NH-N\overset{\overset{R\ R}{CH-CH}}{\underset{\underset{R\ R}{CH-CH}}{\diagup\diagdown}}N-NH-\overset{S}{\overset{\|}{C}}-NH-Y-$$

wherein R is a member of the class of radicals consisting of hydrogen and a lower alkyl containing up to four carbon atoms and Y is a divalent hydrocarbon radical.

4. The process of claim 1 wherein the copper is eluted from said polymeric material with sulfuric acid having a concentration of at least one molar.

5. The process of claim 1 wherein the copper is recovered from said polymeric material by contacting same with a solution of cyanide ion.

6. The process of claim 3 wherein the polymer is the condensation product of N,N'-diaminopiperazine and methylene bis(4-phenylisothiocyanate).

7. The process of claim 3 wherein the polymer is the condensation product of N,N'-diaminopiperazine and toluene diisothiocyanate.

8. The process of claim 5 wherein the cyanide solution is sodium cyanide.

9. A process for the selective removal of copper from aqueous solution comprising contacting said solution with a polythiosemicarbazide resin having as the repeating unit $$-NH-\overset{S}{\overset{\|}{C}}-NH-N\overset{\overset{R\ R}{CH-CH}}{\underset{\underset{R\ R}{CH-CH}}{\diagup\diagdown}}N-NH-\overset{S}{\overset{\|}{C}}-NH-Y-$$

wherein R is a member of the class of radicals consisting of hydrogen and a lower alkyl containing up to four carbon atoms and Y is a divalent hydrocarbon radical, with the proviso that said polymer be free of non-specific cation active species.

10. The process of claim 9 wherein the polymer is the condensation product of N,N'-diaminopiperazine and methylene bis(4-phenylisothiocyanate).

11. The process of claim 9 wherein the polymer is the condensation product of N,N'-diaminopiperazine and toluene diisothiocyanate.

12. A process for the removal of copper from non-aqueous solution which comprises contacting said solution with a polymeric material having the repeating unit of the structural formula

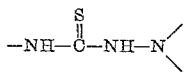

13. The process of claim 12 wherein the polymer is the condensation product of N,N'-diaminopiperazine and methylene bis(4-phenylisothiocyanate).

14. The process of claim 12 wherein the polymer is the condensation product of N,N'-diaminopiperazine and toluene diisothiocyanate.

15. A process for the recovery of copper from gasoline which comprises contacting said gasoline with a polymeric material having the repeating unit of the structural formula

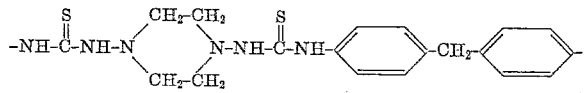

16. A process for the removal of small amounts of dissolved copper from water which comprises contacting said water with a polymeric material which is the condensation product of an N,N'-diamiopiperazine and a diisothiocyanate.

17. The process of claim 16 wherein the polymeric material is the condensation product of N,N'-diaminopiperazine and methylene bis(4-phenylisothiocyanate).

18. The process of claim 16 wherein the polymeric material is the condensation product of N,N'-diaminopiperazine and toluene diisothiocyanate.

19. The process of claim 16 wherein copper is recovered from said polymeric material by elution with an aqueous solution of cyanide ion.

20. The process according to claim 16 wherein copper is recovered from said polymeric material by elution with one molar sulfuric acid.

References Cited by the Examiner
UNITED STATES PATENTS 2,954,276   9/60   Hazel _____ 75—117 X
2,965,441  12/60   Wilton _____ 23—79

OTHER REFERENCES

Bodomer et al., "Ind. & Eng. Chem.," vol. 45, November 1953, pages 2577–2580.

CARL D. QUARFORTH, *Primary Examiner.*

GEORGE D. MITCHELL, *Examiner.*